United States Patent
Lichtfers et al.

(10) Patent No.: US 8,398,749 B2
(45) Date of Patent: Mar. 19, 2013

(54) PROCESS FOR THE RECOVERY OF CARBON DIOXIDE

(75) Inventors: Ute Lichtfers, Karlsruhe (DE); Norbert Asprion, Ludwigshafen (DE); Mark Claessen, Maaseik (BE); Hiroshi Umino, Komae (JP); Koji Tanaka, Yokohama (JP)

(73) Assignee: BASF SE, Ludwigshafen (DE)

( * ) Notice: Subject to any disclaimer, the term of this patent is extended or adjusted under 35 U.S.C. 154(b) by 879 days.

(21) Appl. No.: 12/096,917

(22) PCT Filed: Dec. 12, 2006

(86) PCT No.: PCT/EP2006/069597
§ 371 (c)(1),
(2), (4) Date: Nov. 17, 2008

(87) PCT Pub. No.: WO2007/068695
PCT Pub. Date: Jun. 21, 2007

(65) Prior Publication Data
US 2009/0211447 A1 Aug. 27, 2009

(30) Foreign Application Priority Data
Dec. 12, 2005 (EP) ..................... 05027111

(51) Int. Cl.
*B01D 53/14* (2006.01)

(52) U.S. Cl. ................. 95/183; 95/236; 423/228

(58) Field of Classification Search ............ 95/173–174, 95/183, 193, 201, 209, 236; 423/228–229
See application file for complete search history.

(56) References Cited

U.S. PATENT DOCUMENTS

| | | | |
|---|---|---|---|
| 4,073,863 A | 2/1978 | Giammarco et al. | |
| 4,278,646 A | 7/1981 | Lynn et al. | |
| 4,292,196 A | 9/1981 | Homeier et al. | |
| 4,400,368 A | 8/1983 | Diaz | |
| 4,405,811 A | 9/1983 | Stogryn et al. | |
| 5,348,714 A * | 9/1994 | Peytavy et al. | 423/228 |
| 5,373,048 A | 12/1994 | Witzeman et al. | |

(Continued)

FOREIGN PATENT DOCUMENTS

| DE | 4201921 | 7/1992 |
|---|---|---|
| EP | 0331788 | 9/1989 |

(Continued)

*Primary Examiner* — Duane Smith
*Assistant Examiner* — Ives Wu
(74) *Attorney, Agent, or Firm* — Novak Druce Connolly Bove + Quigg LLP

(57) ABSTRACT

A process for the recovery of carbon dioxide, which includes: (a) an absorption step of bringing a carbon dioxide-containing gaseous feed stream into gas-liquid contact with an absorbing fluid, whereby at least a portion of the carbon dioxide present in the gaseous stream is absorbed into the absorbing fluid to produce (i) a refined gaseous stream having a reduced carbon dioxide content and (ii) an carbon dioxide-rich absorbing fluid; and (b) a regeneration step of treating the carbon dioxide-rich absorbing fluid at a pressure of greater than 3 bar (absolute pressure) so as to liberate carbon dioxide and regenerate a carbon dioxide-lean absorbing fluid which is recycled for use in the absorption step, in which the absorbing fluid is an aqueous amine solution containing a tertiary aliphatic alkanol amine and an effective amount of a carbon dioxide absorption promoter, the tertiary aliphatic alkanol amine showing little decomposition under specified conditions of temperature and pressure under co-existence with carbon dioxide.

5 Claims, 2 Drawing Sheets

U.S. PATENT DOCUMENTS

Figure 1:
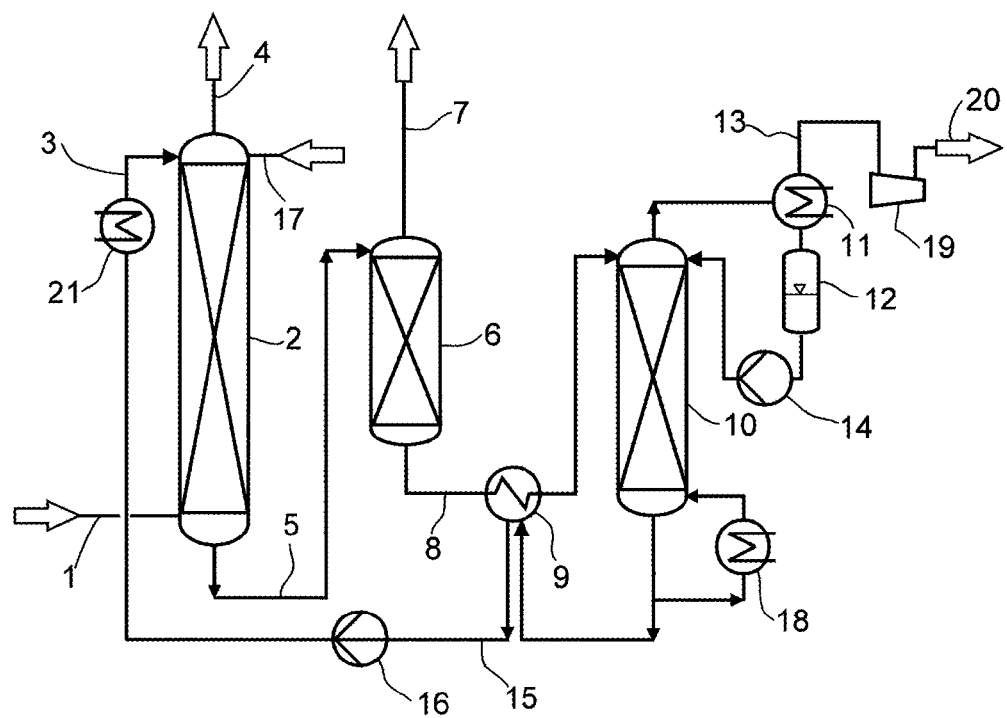

| | | |
|---|---|---|
| 6,267,939 B1 | 7/2001 | Gemes et al. |
| 6,497,852 B2 * | 12/2002 | Chakravarti et al. .......... 423/228 |
| 6,500,397 B1 | 12/2002 | Yoshida et al. |
| 6,939,393 B2 | 9/2005 | Asprion |
| 7,481,988 B2 * | 1/2009 | Katz et al. .................... 423/220 |
| 7,887,620 B2 | 2/2011 | Asprion |
| 2004/0036055 A1 | 2/2004 | Asprion et al. |
| 2006/0162559 A1 | 7/2006 | Asprion et al. |
| 2007/0020163 A1 | 1/2007 | Asprion et al. |
| 2007/0077188 A1 | 4/2007 | Katz et al. |
| 2008/0025893 A1 | 1/2008 | Asprion |
| 2008/0098892 A1 | 5/2008 | Asprion |
| 2008/0236390 A1 | 10/2008 | Anders |
| 2009/0199713 A1 | 8/2009 | Asprion et al. |
| 2010/0236408 A1 | 9/2010 | Asprion |

FOREIGN PATENT DOCUMENTS

| | | |
|---|---|---|
| EP | 0368422 | 5/1990 |
| EP | 279 667 | 9/1995 |
| EP | 0671200 | 9/1995 |
| EP | 0768365 | 4/1997 |
| EP | 1 062 999 | 12/2000 |
| EP | 1582250 | 10/2005 |
| GB | 786669 | 11/1957 |
| JP | 08252430 | 1/1996 |
| WO | WO 02/07862 | 1/2002 |
| WO | WO 02/09849 | 2/2002 |
| WO | WO-03076049 | 9/2003 |
| WO | WO-2004082809 | 9/2004 |
| WO | WO-2005009592 | 2/2005 |
| WO | WO-2005044955 | 5/2005 |
| WO | WO 2005044955 * | 5/2005 |
| WO | WO 2005/087349 | 9/2005 |
| WO | WO 2005/087350 | 9/2005 |
| WO | WO 2006/022885 | 3/2006 |
| WO | WO 2007/045679 | 4/2007 |
| WO | WO 2007/104800 | 9/2007 |

* cited by examiner

PROCESS FOR THE RECOVERY OF CARBON DIOXIDE

CROSS REFERENCE TO RELATED APPLICATIONS

This application is a National Phase filing under 35 U.S.C. §371 of PCT/EP2006/069597 filed Dec. 12, 2006, which claims priority to Patent Application No. 05027111.3, filed in Europe on Dec. 12, 2005. The entire contents of the above-applications are incorporated herein by reference.

The present invention relates to a process for the recovery of carbon dioxide from carbon dioxide-containing gaseous streams, wherein the carbon dioxide is recovered at a pressure above atmospheric pressure.

Natural gas produced in a gas field usually contains an appreciable amount of carbon dioxide. In order to reduce the cost of transporting such natural gas from its production spot to a remote consumption place, and of adjusting its calorific value to the standard at the consumption place, some carbon dioxide is previously removed therefrom to produce refined natural gas with a reduced carbon dioxide content.

On an industrial scale, aqueous solutions of organic bases, for example alkanolamines, are frequently used as absorbing fluids to remove carbon dioxide from gaseous streams. When carbon dioxide dissolves, ionic products form from the base and the carbon dioxide. The absorbing fluid can be regenerated by expansion to a lower pressure, or stripping, with the ionic products back-reacting to liberate the carbon dioxide and/or the carbon dioxide being stripped off by steam. The absorbing fluid can be re-used after the regeneration process. Common alkanolamines used in the removal of acid gas impurities from hydrocarbon gas streams comprise monoethanolamine (MEA), diethanolamine (DEA), triethanolamine (TEA), diethylethanolamine (DEEA), diisopropylamine (DIPA), aminoethoxyethanol (AEE) and methyldiethanolamine (MDEA).

Conventionally, the carbon dioxide separated from the natural gas at the production spot is seldom utilized. That is, such carbon dioxide has been dumped directly into the atmosphere or has rarely been used as an injection gas for tertiary oil recovery in an oil field. Accordingly, little consideration has been given to the pressure of the carbon dioxide separated by the aforesaid refining process.

In recent years, global warming due to an increase of atmospheric carbon dioxide has come to be regarded as a problem. Accordingly, the present situation is such that the carbon dioxide separated in the above-described manner must be pressurized in order to inject it into an underground aquifer for the purpose of permanent storage or to use it positively for the purpose of enhanced oil recovery.

However, in spite of the fact that high-pressure natural gas is treated, the carbon dioxide separated from natural gas by a conventionally employed process has a low pressure close to atmospheric pressure. This is disadvantageous in that, for the above-described purpose of permanent storage or enhanced oil recovery, the carbon dioxide must be pressurized from a low pressure to a pressure of about 150 bar (absolute pressure) which is required for injection.

The prior art discloses several processes in which the carbon dioxide is recovered at a pressure higher than atmospheric pressure. An advantage of carrying out the regeneration step at above atmospheric pressure is that low pressure stages of compression may be eliminated.

Thus, EP-A 768 365 teaches a process for removal of highly concentrated carbon dioxide from high-pressure natural gas which comprises an absorption step of bringing natural gas having a pressure of 30 kg/cm$^2$ (30 bar absolute pressure) or greater into gas-liquid contact with an absorbing fluid; and a regeneration step of heating the carbon dioxide-rich absorbing fluid without depressurizing it, whereby high-pressure carbon dioxide is liberated. Specific examples of the absorbing fluid mentioned in this reference are an aqueous solution of N-methyldiethanolamine (MDEA), an aqueous solution of triethanolamine and an aqueous solution of potassium carbonate. It is stated that these solutions may have a $CO_2$ absorption promoter (e. g. piperazine) added thereto.

U.S. Pat. No. 6,497,852 describes a carbon dioxide recovery process by preferentially absorbing carbon dioxide from a feed stream into a liquid absorbent fluid, pressurizing the resulting stream to a pressure sufficient to enable the stream to reach the top of a stripper at a pressure of 35 psia (2.4 bar absolute pressure) or greater, and stripping carbon dioxide from the stream in the stripper at a pressure of 35 psia (2.4 bar absolute pressure) or greater. The absorbent fluid is preferably an aqueous alkanolamine solution. Specific examples mentioned are monoethanolamine, diethanolamine and N-methyldiethanolamine.

WO 2004/082809 discloses a process for the removal of an acid gas from a gaseous feed stream comprising a regeneration step of heating the acid gas-rich absorbing fluid at a pressure greater than atmospheric pressure. The absorbing fluid comprises an aqueous solution of tertiary alkylamines selected from diamines, triamines and tetramines such as tetramethylethylenediamine, tetraethylethylenediamine, tetramethyl-1,3-propanediamine, tetraethyl-1,3-propanediamine, tetramethyl-1,3-butanediamine, tetramethyl-1,4-butanediamine, tetraethyl-1,3-butanediamine, tetraethyl-1,4-butanediamine, pentamethyldiethylenetriamine, pentaethyldiethylenetriamine, pentamethyl-dipropylenetriamine and pentamethyl-(2-aminoethyl)-1,3-propanetriamine or hexa-methyltriethylenetetramine and hexaethyltriethylenetetramine. It is claimed that these amines have a high stability at the heating temperature of the regeneration step and have a high acid gas loading. However, these amines show poor carbon dioxide transfer rates.

WO 2005/009592 relates to an acid gas regeneration process which is conducted under a pressure that exceeds 50 psia (3.5 bar absolute pressure) and does not exceed 300 psia (20 bar absolute pressure). The separated gas stream emerging from the regenerator is compressed and injected into a sub-surface reservoir. The absorbing fluid as exemplified in the working examples consists of 43% by weight of N-methyldiethanolamine (MDEA) and 57% by weight of water.

WO 03/076049 teaches a washing liquid for deacidifying gaseous streams, containing 3-dimethylamino-1-propanol and a secondary amine as an activator. The reference suggests that the absorbing liquid be regenerated by flashing to a pressure of from 1 to 2 bar (absolute pressure) or by stripping at a pressure of from 1 to 3 bar (absolute pressure).

The higher the pressure at which the carbon dioxide is recovered in the regeneration step, the higher the temperature to which the carbon dioxide-rich absorbing fluid must be heated in order to release the carbon dioxide and to regenerate the absorbing fluid. High temperatures pose thermal stress on the absorbing fluid. It has been found that, with the known processes employing aqueous alkanolamine solutions, the absorption capacity of the absorbing fluid is impaired in the long term and is not completely recovered on regeneration. It is probable that the amines present in the absorbing fluid gradually undergo thermal decomposition.

It is an object underlying the invention to specify an absorbing fluid and a process for deacidifying gaseous streams, the absorption capacity of the absorbing fluid being maintained in the long term.

In a first aspect, the invention provides a process for the recovery of carbon dioxide, comprising:

a) an absorption step of bringing a carbon dioxide-containing gaseous feed stream into gas-liquid contact with an absorbing fluid, whereby at least a portion of the carbon dioxide present in the gaseous stream is absorbed into the absorbing fluid to produce (i) a refined gaseous stream having a reduced carbon dioxide content and (ii) an carbon dioxide-rich absorbing fluid, b) a regeneration step of treating the carbon dioxide-rich absorbing fluid at a pressure of more than 3 bar (absolute pressure) so as to liberate carbon dioxide and regenerate a carbon dioxide-lean absorbing fluid which is recycled for use in the absorption step, wherein the absorbing fluid is an aqueous amine solution containing a tertiary aliphatic alkanol amine and an effective amount of a carbon dioxide absorption promoter, the tertiary aliphatic alkanol amine showing less than 5% decomposition when an aqueous solution of the tertiary aliphatic alkanol amine at a concentration of 4 mol/l is kept during 300 hours under a vapor-liquid equilibrium condition at a temperature of 162° C. and a total pressure of 6.3 bar (absolute pressure) under co-existence of the aqueous solution and carbon dioxide.

The present inventors envisaged a test for evaluating the suitability of a tertiary aliphatic alkanol amine in the process of the invention. This test involves keeping an aqueous solution of the tertiary aliphatic alkanol amine (without the addition of a carbon dioxide absorption promoter) at a concentration of 4 mol/l of the tertiary aliphatic alkanol amine during 300 hours under a vapor-liquid equilibrium condition at a temperature of 162° C. and a total pressure of 6.3 bar (absolute pressure) under co-existence of the aqueous solution and carbon dioxide. Samples are withdrawn from the aqueous solution at the beginning and after the 300 hour period and are analyzed, e. g., by gas chromatography. The amount of unalterated amine is calculated from the detected signals. Suitable amines show a decomposition of less than 5% by weight of the original amine, preferably less than 3% by weight. The test is described in more detail in the working examples that follow.

The stability test according to the invention is conducted in the presence of highly concentrated carbon dioxide. Surprisingly, the thermal stability of alkanol amines as determined under these conditions may be significantly different from the thermal stability in the absence of carbon dioxide. Hence, the test according to the invention allows a valid evaluation of the stability of alkanol amines under the conditions encountered in the regeneration step of medium to high pressure regeneration of carbon dioxide-rich absorbing fluids.

In a second aspect, the invention provides a process for the recovery of carbon dioxide, comprising:

a) an absorption step of bringing a carbon dioxide-containing gaseous feed stream into gas-liquid contact with an absorbing fluid, whereby at least a portion of the carbon dioxide present in the gaseous stream is absorbed into the absorbing fluid to produce (i) a refined gaseous stream having a reduced carbon dioxide content and (ii) an carbon dioxide-rich absorbing fluid, b) a regeneration step of treating the carbon dioxide-rich absorbing fluid at a pressure of more than 3 bar (absolute pressure) so as to liberate carbon dioxide and regenerate a carbon dioxide-lean absorbing fluid which is recycled for use in the absorption step, wherein the absorbing fluid is an aqueous amine solution containing a tertiary aliphatic alkanol amine other than N-methyldiethanolamine, and an effective amount of a carbon dioxide absorption promoter.

The absorbing fluid contains a tertiary aliphatic alkanol amine other than N-methyldiethanolamine. It has been shown that tertiary alkanol amine are superior to primary and secondary alkanol amine in terms of stability under conditions of high temperature and high carbon dioxide pressure.

The tertiary amine used in the present invention is an alkanole amine, i. e. it comprises, in its molecular structure, a nitrogen atom that is substituted by at least one hydroxyalkyl moiety. In general, the tertiary aliphatic alkanol amine comprises 4 to 12 carbon atoms. Preferably, the tertiary aliphatic alkanol amine comprises a single nitrogen atom in its molecular structure, i. e. the tertiary aliphatic alkanol amine preferably is a monoamine.

Typically, the hydroxyalkyl moiety has 2 to 4 carbon atoms, preferably 2 or 3 carbon atoms. Preferably, the hydroxyalkyl moiety is selected from the group consisting of 2-hydroxyethyl, 3-hydroxypropyl, 2-hydroxypropyl and 2-hydroxybutyl. The substituent(s) on the nitrogen atom(s) apart from the hydroxyalkyl moiety are preferably alkyl moieties, preferably of 1 to 3 carbon atoms, such as methyl, ethyl, propyl or isopropyl.

It has been found that a tertiary aliphatic alkanol amine containing, in its molecular structure, a nitrogen atom that is substituted by more than one 2-hydroxyethyl moiety, or a nitrogen atom that is substituted by both a 2-hydroxyethyl moiety and a methyl moiety, such as, e.g. N-methyldiethanolamine (MDEA), has limited thermal stability in the above-defined process.

In preferred embodiments, the tertiary aliphatic alkanol amine therefore does not contain, in its molecular structure, a nitrogen atom that is substituted by more than one 2-hydroxyethyl moieties.

In other preferred embodiments, the tertiary aliphatic alkanol amine does not contain, in its molecular structure, a nitrogen atom that is substituted by both a 2-hydroxyethyl moiety and a methyl moiety.

In preferred embodiments, the tertiary aliphatic alkanol amine contains, in its molecular structure, a single nitrogen atom, the nitrogen atom being substituted by one hydroxyalkyl moiety and two alkyl moieties.

Specific examples of useful tertiary aliphatic alkanol amines include N-ethyldiethanolamine (2-[ethyl-(2-hydroxyethyl)-amino]-ethanol, EDEA), 2-(dimethylamino)-ethanol (N,N-dimethylaminoethanol, DMEA), 2-(diethylamino)-ethanol (N,N-diethylethanolamine, DEEA), 3-(dimethylamino)-1-propanol (DMAP), 3-(diethylamino)-1-propanol, 1-(dimethylamino)-2-propanol (N,N-dimethylisopropanolamine), and 2-(diisopropylamino)-ethanol (N,N-diisopropylethanolamine).

A particularly preferred tertiary aliphatic alkanol amine to be used in the present invention is 3-(dimethylamino)-1-propanol (DMAP). Another preferred tertiary aliphatic alkanol amine is 2-(diethylamino)-ethanol (N,N-diethylethanolamine, DEEA).

It is useful to designate the nitrogen-bearing carbon as α and the carbon atom(s) adjacent to it as β. It is assumed that, once the nitrogen atom has become protonated or quaternized, replacement or substitution of the nitrogen on the α-carbon by a nucleophilic reagent is involved in degradation reactions. The nature of substituents, if any, at the β-carbons has an influence on the ease of such nucleophilic substitution. It is considered that a hydroxy group at the β carbon, such as present in the 2-hydroxyethyl moiety, mediates such a nucleophilic attack. We further believe that the number of hydroxyethyl moieties attached to one nitrogen atom is related to the stability of alkanolamines. Compounds incorporating nitrogen atom(s) that are substituted by more than one 2-hydroxyethyl moiety are more susceptible to decomposition. On the other hand, if the β carbon bears, besides the hydroxy group, an alkyl group, such as, e. g., in the 2-hydroxypropyl moiety, the β effect of the hydroxy group is reduced by the steric effect of the alkyl group. Accordingly, a 2-hydroxypropyl moiety or a 2-hydroxybutyl moiety is a preferred hydroxyalkyl moiety in the context of this invention.

The mediating effect of the 2-hydroxyethyl moiety is also, at least in part, attributable to the ease with which an intermediary 3-membered cyclic structure is formed. As 4-membered cyclic structures are less easily formed, a 3-hydroxypropyl moiety has no significant mediating effect. Hence, a 3-hydroxypropyl moiety is a preferred hydroxyalkyl moiety in the context of this invention. Actually, it has been shown by experiments that when 3-(dimethylamino)-1-propanol is exposed to sufficient thermal stress, the 3-hydroxypropyl moiety is released as allyl alcohol rather than as a 4-membered cyclic structure.

Without wishing to be bound by theory, it is believed that the initial steps of MDEA degradation may be illustrated by the following reaction schema:

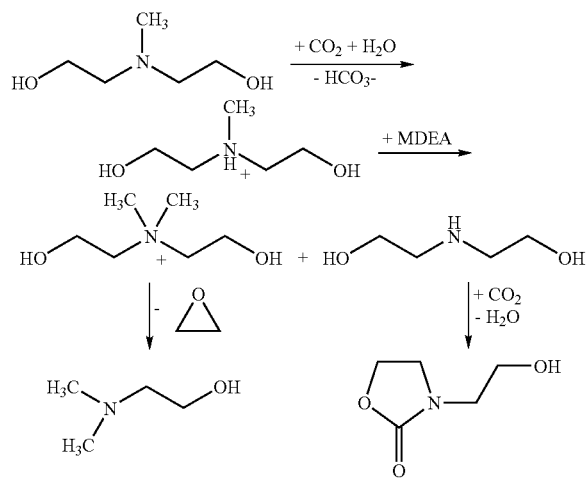

Thus, a MDEA molecule is initially protonated by an acidic proton from carbonic acid which is formed from carbon dioxide and water. The protonated MDEA molecule may then transfer one of its methyl residues to another molecule of MDEA to yield a di(2-hydroxyethyl) dimethylammonium cation and a molecule of diethanolamine. The cation thus formed may eliminate an ethylene oxide molecule (which in turn may react with a water molecule to yield a molecule of ethylene glycol). The diethanolamine may react with carbon dioxide to form the 5-membered cyclic structure of 3-(2-hydroxyethyl) 1,3-oxazolid-2-one which undergoes further decomposition.

The absorbing fluid used in the process of the invention further contains an effective amount of a carbon dioxide absorption promoter. The absorption promoter is usually selected from primary or secondary amines, preferably secondary amines, and serves to accelerate the uptake of carbon dioxide by the intermediate formation of a carbamate structure. Specific examples of useful absorption promoters include piperazine, 2-methylpiperazine, N-methylpiperazine, N-ethylpiperazine, N-hydroxyethyl piperazine, N-(2-aminoethyl) piperazine, homopiperazine, piperidine and morpholine.

In general, the absorbing fluid contains 20 to 60% by weight, preferably 25 to 55% by weight, of the tertiary aliphatic alkanol amine.

In general, the absorbing fluid contains 0.5 to 20% by weight, preferably 1 to 15% by weight, of the carbon dioxide absorption promoter.

The gaseous feed stream may be a high-pressure gaseous feed stream, for example, a high pressure natural gas stream or synthesis gas stream. Alternatively, the gaseous feed stream may be a low-pressure gaseous feed stream, for example a combustion gas stream from a power station or refinery. By high-pressure gaseous feed stream is meant a gaseous stream having a pressure of 10 bar (absolute pressure) or greater, for example of from 10 bar to 150 bar. By low-pressure gaseous feed stream a gaseous stream having a pressure of at or close to atmospheric pressure is understood.

Besides carbon dioxide, the gaseous stream may comprise other acidic gases, in particular hydrogen sulfide ($H_2S$), and/or $SO_2$, $CS_2$, HCN, COS, disulfides or mercaptanes. If present, these acidic components are, at least in part, removed from the gaseous stream along with the carbon dioxide when the gaseous stream is subjected to treatment by the process according to the invention.

Preferably, the amount of carbon dioxide in the high-pressure gaseous feed stream is in the range 1 to 95% by volume. Typically, an unrefined high-pressure natural gas stream comprises 1 to 40% by volume carbon dioxide, preferably 5 to 25% by volume, for example, 10 to 15% by volume. Suitably, the amount of hydrogen sulphide in the unrefined high-pressure natural gas stream is at least 0.02% by volume (at least 200 ppmv). Where the refined high-pressure natural gas stream is to be transported through a pipeline, for example, to an electricity generating power station or to a domestic gas distribution system, it is desired to reduce the amount of carbon dioxide in the refined high-pressure natural gas stream to a level of less than 3% by volume, preferably less than 2% by volume. Preferably, the amount of carbon dioxide in the refined high-pressure natural gas stream may be further reduced using the process of the present invention. For example, where the refined high-pressure natural gas stream is to be employed as a feed stream to a cryogenic processing unit for generating liquefied natural gas (LNG), it is desired to reduce the amount of carbon dioxide in the refined high-pressure natural gas stream to a level of less than 100 ppmv, preferably to a level of 50 ppmv or less. In both cases, it is preferred to reduce the amount of hydrogen sulphide in the refined high-pressure natural gas stream to a level of less than 10 ppmv, more preferably 4 ppmv or less.

The amount of carbon dioxide in the low-pressure gaseous feed stream is at least 1.5% by volume. Preferably, the amount of carbon dioxide in the refined low-pressure gaseous stream is reduced to a value of less than 100 ppmv, more preferably 50 ppmv or less.

In the absorption step the carbon dioxide-containing gaseous feed stream is brought into gas-liquid contact with the absorbing fluid. To this end any suitable absorber may be employed. The absorber may contain contacting means such as trays, packed beds or other contact devices which provide intimate contact between the gaseous stream and the absorbing liquid. The gaseous stream may be introduced into the lower section of the absorber and pass to the top of the absorber. The absorbing fluid may be introduced into the upper portion of the absorber and pass to the bottom of the absorber countercurrently to the gaseous stream.

In the absorption step, the temperature of the absorbing fluid should not exceed 100° C., since at higher temperatures the attainable carbon dioxide loading is less and, generally, high temperatures cause undesirable corrosion. The absorption step is, as a rule, carried out at an absorber top temperature of from 60° to 80° C., though the temperature may be as high as 95° C. The absorption step can also be carried out at lower temperatures, e. g. from 40° C. upward; however, such low temperatures result in an increased consumption of energy, particularly if the regeneration is carried out by stripping. The bottom temperature of the absorber should not be higher than 100° C.

In the regeneration step the carbon dioxide-rich absorbing fluid is treated so as to liberate carbon dioxide (and other acidic gases, if present in the gaseous feed stream) and regenerate a carbon dioxide-lean absorbing fluid which is recycled for use in the absorption step. The regeneration step requires heating of the carbon dioxide-rich absorbing fluid, typically to a temperature above 130° C., preferably above 150° C.

When the absorption step is conducted at a high pressure (typically in the treatment of a high-pressure gaseous feed stream), the regeneration step typically comprises expansion or flashing the carbon dioxide-rich absorbing fluid from the high pressure prevailing in the absorber to a lower pressure. The pressure expansion can be carried out, for example, using a throttle valve. Additionally, or alternatively, the absorbing fluid can be passed through an expansion turbine which can drive a generator and produce electrical energy. In this flashing step, preferably inert gases are released, such as absorbed components of the gaseous feed stream.

When the absorption step is conducted at a low pressure (typically in the treatment of a low-pressure gaseous feed stream), the carbon dioxide-rich absorbing fluid must be pressurized to at least the pressure used in the regeneration step, before the carbon dioxide-rich absorbing fluid enters the regeneration step.

Preferably, the regeneration step comprises stripping the absorbing liquid with an inert fluid. For this purpose the absorbing liquid and a stripping medium (a hot inert gas, nitrogen or steam being preferred) are passed in countercurrent fashion through a desorption column provided with loose packings, arranged packings or plates.

Before being fed into the absorber, the carbon dioxide-lean absorbing fluid is usually passed through a heat exchanger and brought to the temperature required for the absorption step. The heat removed from the regenerated absorbing fluid leaving the stripping column may be used to pre-heat the carbon dioxide-rich absorbing fluid leaving the absorption step.

According to the invention, the regeneration step is conducted at a pressure of greater than 3 bar, preferably of from greater than 3 bar to 10 bar, e. g. from 3.5 bar to 10 bar.

Preferably, the stream comprising the carbon dioxide that is liberated during the regeneration step is dumped into an underground zone for the purpose of storage. For example, the stream comprising the carbon dioxide may be injected into a hydrocarbon bearing subterranean formation, in particular, an oil-bearing subterranean formation for the storage and/or enhanced oil recovery. The liberated gaseous stream will require pressurizing to a pressure that is sufficiently high to permit injection into the underground zone. An advantage of carrying out the regeneration step at above atmospheric pressure is that low pressure stages of compression may be eliminated. For example, carrying out the regeneration step at a pressure of 5 bar (absolute pressure) permits at least one stage of compression to be eliminated, while carrying out the regeneration step at a pressure of 9 bar has the potential to eliminate up to 2 stages of compression when compared with liberating the acid gas at atmospheric pressure.

The invention will now be described in more detail on the basis of the accompanying figures and the examples hereinafter.

Figure 2:
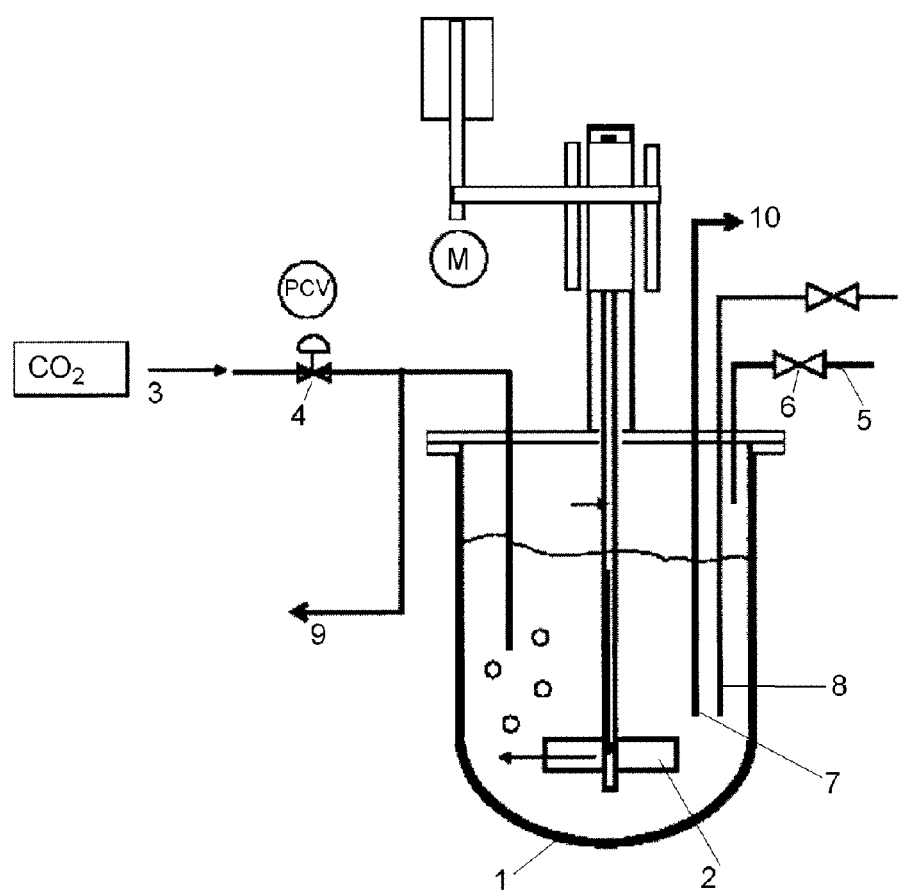

FIG. 1 shows a preferred arrangement for carrying out the inventive process; and FIG. 2 shows the arrangement used for evaluating the thermal stability of aqueous alkanol amine solutions in the presence of carbon dioxide.

With reference to FIG. 1, the gaseous feed stream, which is, for example, natural gas at a pressure of about 50 bar and comprises acidic gases such as $H_2S$, $CO_2$ and COS, is passed via a feed line 1 into an absorption column 2. The absorption column 2 ensures intimate contact of the gaseous feed stream with an absorbing fluid. The absorbing fluid is introduced via feed line 3 into the top region of the absorption column 2 and is passed in countercurrent to the gaseous feed stream.

The gaseous stream which is substantially freed from acidic gas constituents leaves the absorption column 2 via a top takeoff 4.

The carbon dioxide-rich absorbing fluid leaves the absorption column 2 via line 5 and passes into the top region of an expansion column 6. In the expansion column 6, the pressure of the absorbing fluid is suddenly reduced to about 5 to 9 bar so that the lighter components of the gaseous stream can evaporate from the absorbing fluid. These components can be burnt or recirculated to absorption column 2. The absorbing fluid leaves the first expansion column 6 via line 8 at the bottom of the column, while the vaporized components of the gaseous stream are removed via line 7 at the top of the expansion column 6.

The absorbing fluid then passes into column 10. Carbon dioxide liberated in column 10 leaves the column at the top thereof. A reflux condenser 11 with collecting vessel 12 recirculates the entrained absorbing fluid droplets to column 10. Carbon dioxide is drawn off via line 13 and may be compressed by means of a compressing device 19 and introduced via line 20 into a storage device. Part of the regenerated absorbing fluid leaving the bottom of column 10 is heated by means of reboiler 18 and recirculated into column 10.

The regenerated absorbing fluid leaving the bottom of column 10 is pumped via a pump 16 through a heat exchanger 9 where it serves to pre-heat the carbon dioxide-rich absorbing fluid passed through line 8. The regenerated absorbing fluid may then pass the optional lean cooler 21 where its temperature is further adjusted. The absorbing fluid enters the absorbing column 2 via line 3. Fresh absorbing fluid may be supplemented at line 17.

With reference to FIG. 2, the arrangement used for evaluating the thermal stability of aqueous alkanol amine solutions comprises a reaction vessel 1 (having a volume of about 1 liter), equipped with an electrically driven paddle stirrer 2, a gas inlet line 3 with pressure control valve 4, a gas purge line 5 with valve 6, and a thermo couple 7. The reaction vessel 1 can be kept at a controlled temperature by means of a transparent heater (not shown) fitted to the surface of the vessel. Samples can be withdrawn from the contents of the reaction vessels via sampling line 8. Pressure and temperature signals can be continuously fed into a data recorder (not shown) via the electrical data lines 9 and 10.

EXAMPLE 1

An arrangement as shown in FIG. 2 is used for the thermal stability tests. For a typical experiment, 600 ml of the amine solution of the desired amine concentration is placed in the autoclave with stirring. The autoclave and the liquid were purged with $CO_2$ gas by alternately pressurizing and depressurizing the autoclave (0 to 5 bar above atmospheric) with $CO_2$ ten times. The autoclave was heated gradually and maintained at the desired temperature. Stripped $CO_2$ was purged and the pressure was maintained at the desired pressure. Evaporated water vapour was cooled at 5° C. and the condensed water was refluxed into the autoclave. After the temperature and the pressure in the autoclave were stabilized at the desired values, the degradation test run was started. The preparative procedure prior to the test run took approximately 30 minutes.

Sample liquids were withdrawn from the autoclave at appropriate intervals and were analyzed by gas chromatography.

The degradation test run was carried out at a temperature of 162° C. and a pressure (absolute pressure) of 6.3 bar over 300 hours. No carbon dioxide absorption promoter was added.

The conditions used for gas chromatography were as follows: Model: Shimadzu GC-14A equipped with a TC-5 capillary column (30 m by 0.32 mm ID, GL Sciences Inc., Tokyo, Japan); Column temperature: 40° C. (5 min)-10° C./min-280° C. (15 min); Carrier gas: He; Sample injection volume: 1 µl; Detector: FID.

The results are summarized in the table 1 below. $C_0$ denotes the amine concentration at the beginning of the experiment; c denotes the concentration of unaltered amine after 300 hours.

TABLE 1

Thermal stability of tertiary aliphatic alkanol amines at 162° C. and 6.3 bar

| Amine | $C_0$ [mol/l] | $C/C_0$ | Degradation [%] |
|---|---|---|---|
| MEA | 3 | 0.68 | 32 |
| DEA | 3 | 0.32 | 68 |
| DIPA | 2 | 0.78 | 22 |
| DMAP | 4 | 0.99 | 1 |
| MDEA | 4 | 0.94 | 6 |
| DMEA | 4 | 0.96 | 4 |
| DEEA | 4 | 0.99 | 1 |
| EDEA | 4 | 0.99 | 1 |
| DEAP | 4 | 0.99 | 1 |

MEA denotes 2-hydroxyethylamine (also referred to as Mono Ethanol Amine)
DEA denotes bis(2-hydroxyethyl)amine (also referred to as diethanolamine)
DIPA denotes 1-(2-hydroxypropylamino)propan-2-ol (also referred to as diisopropanolamine)
DMAP denotes 3-dimethylamino-1-propanol
MDEA denotes 2-(2-hydroxyethyl-methyl-amino)ethanol (also referred to as N-methyldiethanolamine)
DMEA denotes 2-(dimethylamino)ethanol (also referred to as N,N-dimethylethanolamine)
DEEA denotes 2-(diethylamino)ethanol (also referred to as N,N-diethylethanolamin)
EDEA denotes (2-[ethyl-(2-hydroxyethyl)-amino]-ethanol (also referred to as N-ethyldiethanolamine)
DEAP denotes 3-diethylaminopropanol The results show that the stability of primary and secondary alkanol amines (such as MEA, DEA or DIPA) is significantly inferior to that of tertiary alkanol amines. The test also shows that MDEA (having two hydroxyethyl moieties on its nitrogen atom) is less stable than DMAP and DEAP (having only one 3-hydroxypropyl moiety) or DMEA and DEEA (having only one 2-hydroxyethyl moiety). Surprisingly, although both MDEA and EDEA have two hydroxyethyl moieties on their respective nitrogen atoms, EDEA proves to be more stable than MDEA. This may be contributed to the fact that abstraction or replacement of an ethyl group (as contained in the EDEA molecule) proceeds with less ease than that of a methyl group (as contained in the MDEA molecule).

We claim:

1. A process for the recovery of carbon dioxide, comprising:
  a) an absorption step of bringing a carbon dioxide-containing gaseous feed stream into gas-liquid contact with an absorbing fluid, whereby at least a portion of the carbon dioxide present in the gaseous stream is absorbed into the absorbing fluid to produce (i) a refined gaseous stream having a reduced carbon dioxide content and (ii) a carbon dioxide-rich absorbing fluid, and
  b) a regeneration step of treating the carbon dioxide-rich absorbing fluid at a pressure of greater than 3 bar (absolute pressure) so as to liberate carbon dioxide and regenerate a carbon dioxide-lean absorbing fluid which is recycled for use in the absorption step,
  wherein the absorbing fluid is an aqueous amine solution containing a tertiary aliphatic alkanol amine selected from the group consisting of N-ethyldiethanolamine, 2-(diethylamino)-ethanol, 3-(dimethylamino)-1-propanol and 3-(diethylamino)-1-propanol, and an effective amount of a carbon dioxide absorption promoter,
  wherein the carbon dioxide absorption promoter is selected from the group consisting of: piperazine, 2-methylpiperazine, N-methylpiperazine, N-ethylpiperazine, N-hydroxyethyl piperazine, homopiperazine, piperidine, and morpholine.

2. The process of claim 1, wherein the absorbing fluid contains 20 to 60% by weight of the tertiary aliphatic alkanol amine.

3. The process of claim 1, wherein the absorbing fluid contains 0.5 to 20% by weight of the carbon dioxide absorption promoter.

4. The process of claim 1, wherein the regeneration step is carried out at a pressure of from greater than 3 bar to 10 bar (absolute pressure).

5. The process of claim 1, wherein the liberated carbon dioxide is introduced into a compression device.

* * * * *

UNITED STATES PATENT AND TRADEMARK OFFICE
CERTIFICATE OF CORRECTION

PATENT NO. : 8,398,749 B2
APPLICATION NO. : 12/096917
DATED : March 19, 2013
INVENTOR(S) : Lichtfers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this
First Day of September, 2015

Michelle K. Lee
*Director of the United States Patent and Trademark Office*